Sept. 8, 1970   J. W. WOODS   3,527,277

NUT MEAT CHOPPER AND METHOD OF MAKING SAME

Filed Nov. 17, 1967

INVENTOR
J. Walter Woods

Attorney

United States Patent Office 3,527,277
Patented Sept. 8, 1970

3,527,277
NUT MEAT CHOPPER AND METHOD OF
MAKING SAME
J. Walter Woods, Rockford, Ill., assignor, by mesne assignments, to Androck Incorporated, Worcester, Mass., a corporation of New York
Filed Nov. 17, 1967, Ser. No. 683,861
Int. Cl. A47j 42/24
U.S. Cl. 146—123                5 Claims

ABSTRACT OF THE DISCLOSURE

This chopper, designed for use in the home, has a molded plastic hopper with a cylindrical lower end portion inside which is an integral undulated rib spaced a pre-determined distance from the lower end, against the bottom of which an undulated slotted metal plate for cutting purposes is located. Slots in diametrically opposed relation are provided in the lower end of the hopper to locate and provide bearing support for the shaft portion of a hand operable crank, the shaft carrying a toothed cutter plate, the teeth of which operate through the slots in the aforesaid plate to chop nut meats placed in the hopper. A cap ring of plastic material has a telescoping fit on the lower end of the hopper and has a rim which by engagement with the shaft from below locates the same and the cutter plate properly relative to the slotted plate. Both the hopper and cap ring are of thermoplastic material and are fused together by heat of friction by rotation of the ring relative to the hopper while these telescoped parts are pressed together.

---

This invention relates to nut meat choppers of the rotary type and is particularly concerned with improvements on that disclosed in Di Pierro et al. Pat. No. 3,313,331, issued Apr. 11, 1967.

In the Di Pierro et al. Nut Meat Chopper, a stationary undulated slotted plate in the hopper cooperates with a rotary toothed cutter bar on a shaft turned relative to it by means of a crank, the nut meats to be chopped resting in troughs in the undulated slotted plate, through which teeth of the cutter bar, appropriately bent for best chopping efficiency, operate to chop the nuts regardless of which direction the crank is turned. The slotted plate is molded in place as an insert in the molding of the hopper of a suitable plastic material, such as polypropylene, enough additional thickness being provided around the periphery of the undulated circular slotted plate to hold it securely and seal the joint from above and below all around the periphery. Diametrically opposed vertical slots are provided in the cylindrical lower portion of the hopper to locate the shaft with its rotary toothed cutter bar in proper diametrical relationship to the undulated slotted plate, the shaft being held in assembled relationship to the slotted plate and hopper when a plastic cap ring is assembled with a snap fit on the lower end of the hopper by engagement of an annular bead on the hopper in an annular groove in the ring.

In accordance with my invention, the above construction is improved with lowered manufacturing costs:

(1) By having the undulated slotted plate as a relatively free part assembled in place in the hopper in engagement with an inwardly projecting undulated bead molded integral with the hopper, giving the necessary closed joint all around the periphery of the plate on the upper side while serving to hold the plate against turning, despite its circular form and the cylindrical form of the lower portion of the hopper, I get the advantage that the plate can "float" a little relative to the cutter bar and thereby avoid any likelihood of clashing and consequent interference with free turning of the cutter bar;

(2) The cutter bar and shaft sub-assembly is assembled in the cylindrical lower end of the hopper immediately after the undulated slotted plate has been inserted, and the half-round crimp in the cutter bar conforms to the shaft to which it is welded and is also concentric to the diametrically extending half-round crimp or undulation of the slotted plate so that the teeth on the cutter bar operate with proper clearance in the slots in the plate, proper centering of the teeth with the slots being assured by spacer washers on the shaft at opposite ends of the cutter bar, and (3) The plastic cap ring that is adapted to thread on the neck of the jar on its lower half, has its upper half made to fit snugly on the cylindrical lower end portion of the hopper with a telescoping fit, both parts being molded of the same thermo-plastic material—polypropylene—to enable easily fusing or bonding these parts together, I have found that the heat of friction is enough when the cap part is rotated at high speed relative to the hopper part a predetermined number of times while pressed into place on the lower end of the hopper for these two parts to be securely fused together, thereby eliminating any likelihood of customer difficulty with the product later, as was present with the earlier construction, where the cap ring was removable and replaceable, leaving it up to the customer to get the toothed cutter bar and shaft sub-assembly with its two spacer washers at opposite ends of the cutter bar properly reassembled in the hopper before the cap was replaced.

The invention is illustrated in the accompanying drawing, in which—

The same reference numerals are applied to corresponding parts throughout the views.

Figure 1:
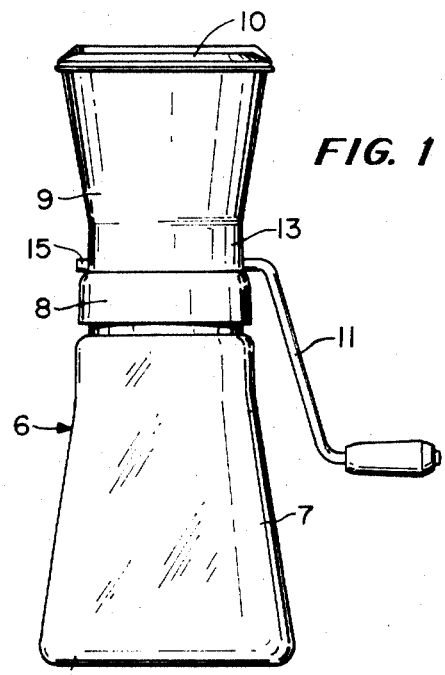
FIG. 1 is a side view of a complete nut meat chopper made in accordance with my invention.
Figure 3:
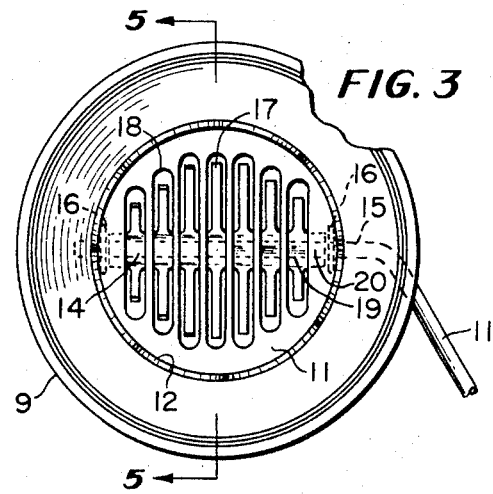
FIG. 3 is a top plane view of the final assembly seen in cross-section in FIG. 5.

Referring to the drawing, my improved nut meat chopper is indicated generally by the reference numeral 6 in FIG. 1 and comprises a jar 7, usually of glass, a plastic screw-on cap 8 and a plastic hopper 9 and lid 10. Nut meats to be chopped are placed in the hopper 9 and chopped by turning crank 11, the chopped particles being caught in the jar 7. The chopped material may be passed again through the chopper to chop it finer. The device can be inverted with the lid 10 removed and used in sprinkling the chopped material on a cake, for example, and, in so doing, the crank 11 can be turned in either direction to do further chopping of the material and also regulate the discharge thereof through the hopper. If the housewife wishes to store a supply of chopped up nutmeats, or other materials, such as olives, cherries, hard-boiled eggs, and many other foods used for sandwich fillings, salads, and so forth, the top assembly 8–10 can be removed and any screw-on cap for a jar of the same size as the jar 7 can be applied to seal the jar and thus better preserve the chopped nut meats or other material for future use.

Figure 4:
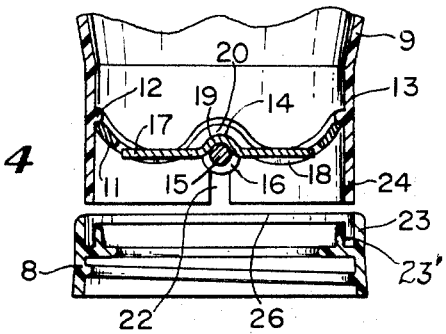
FIG. 4 is an intermediate cross-section showing all but the cap ring assembled.
Figure 2:
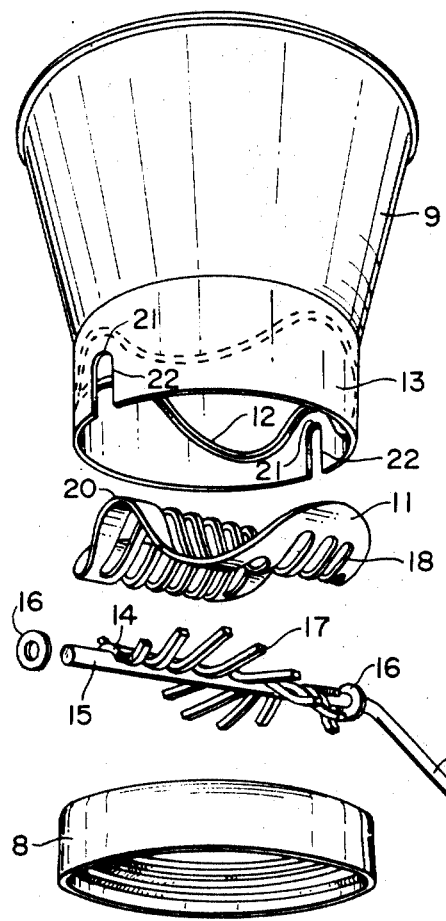
FIG. 2 is an exploded perspective view of the hopper, undulated slotted plate, cutter bar and shaft sub-assembly with opposed spacer washers, and cap ring going to make up the final assembly shown in FIGS. 3 and 5.
Figure 5:
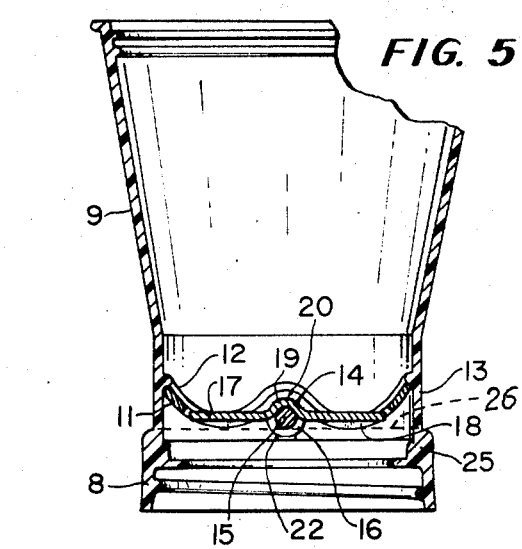
FIG. 5 shows the final assembly in cross-section on the line 5—5 of FIG. 3, with the cap ring fused to and hence integral with the hopper.

Looking now at the other figures, 11 is the undulated slotted circular plate which in the Di Pierro patent had an equivalent part inserted in the mold in the molding of the hopper 9 so that its edge portions were embedded in the plastic material throughout the periphery of the plate. However, in accordance with the present invention, I merely provide an integral inwardly projecting undulated bead 12 on the inside of the cylindrical lower end portion 13 of the hopper, and, in the assembling of the nut meat chopper, the plate 11 is placed against the under side of this bead, as it is shown in FIG. 4, in close contact peripherally with the inside of the lower end portion 13 of the hopper all around, before the cap ring 8 and the rotary toothed cutter bar 14, welded onto the drive shaft 15 provided on the end of the crank 11 as a sub-assembly, are also assembled in place with the two spacer washers 16 at opposite ends of the cutter bar on the shaft. These washers serve by abutment with opposite ends of the cutter bar 14 to keep the teeth 17 out of scraping contact on either side of the slots 18 provided in closely spaced parallel relation in the plate 11. As best appears in FIGS. 4 and 5, the cutter bar 14 is in the form of a sheet metal stamping having a half-round longitudinal mid portion 19 that conforms to the round wire from which the shaft 15 is made, this facilitating aligning the cutter bar properly with respect to the shaft before the two parts are spot welded together at longitudinally spaced intervals for a permanent and inexpensive connection. The half-round longitudinal mid portion 19 of bar 14 is substantially co-axial with the diametrically extending trough portion 20 at the middle of the circular undulated slotted plate 11, so that when the plate 11 and the cutter bar 14 and drive shaft 15 sub-assembly are assembled in the lower cylindrical portion 13 of the hopper 9, as seen in FIG. 4, with the opposite ends of the shaft 15 engaged in the semi-circular inner ends 21 of the diametrically opposed vertical slots 22 and with the washers 16 at opposite ends of the cutter bar 14 abutting the inner side of the cylindrical lower end portion 13 of the hopper adjacent the slots 22, the working parts of the nut meat chopper are properly correlated, and all that remains is to complete the assembly by telescoping the outer and inner upper rim portions 23 and 23' of the cap ring 8 on the lower cylindrical skirt portion 24 of the hopper, and, while the parts 8 and 9 are pressed firmly against one another in a jig or fixture and the cap ring is rotated at a high speed long enough to heat the telescoping parts 23 and 23' and 24 to the point of fusion, the parts remaining pressed together until the fusion or bonding together of the two parts 23 and 23' and 24, is completed as shown at 25 in FIG. 5, whereupon the assembly of FIG. 5 can be removed from the assembling jig or fixture.

In operation, the shaft 15 has its operating position accurately fixed relative to the hopper assembly by contact of its upper half with the half-round upper ends 21 of the diametrically opposed slots 22 while the bottom of the shaft at both ends bears against the flat upper edge 26 on the cap ring 8 at diametrically opposed points. The undulated slotted plate 11 engages the underside of the undulated bead 12, which, of course, is accurately spaced vertically relative to the upper ends 21 of slots 22, and, hence, when the cutter bar 14 and shaft 15 sub-assembly is set in place with washers 16 to limit end play of the shaft 15 and keep the teeth 17 of the cutter bar operating with the right clearance relative to the sides of the slots 18 in plate 11, there is no likelihood of any clash between the teeth 17 and the bars defined between the slots 18 in the plate 11, especially since the plate 11 is free to float and thus avoid clashing. Cleaning this chopper is really no problem. In fact, it is actually less of a problem than the earlier Di Pierro et al. construction, which can be taken apart, and I have the big advantage that there is never any danger of one of the washers 16 missing and interfering with continued good performance of the device. Customers were apt to lose one or both of these washers when the took the Di Pierro et al. device apart, or, if they didn't lose any, they were apt either not to notice where they came from or forget where they belonged and not assemble them in the device. It is, therefore, considered best not to have the device made so it can be taken apart.

It is believed the foregoing description conveys a good understanding of the objects and advantages of my invention. The appended claims have been drawn to cover all legitimate modifications and adaptations.

I claim:

1. In a material chopping device of the character described comprising a hopper having a cylindrical lower portion, a support for the hopper having a cylindrical portion telescoping on the lower cylindrical portion of said hopper, an undulated slotted plate disposed substantially horizontally transversely of and in the lower cylindrical portion of said hopper, a rotary elongated toothed cutter-bar disposed substantially horizontally below said plate with the teeth thereof arranged to extend through the slots in said plate to chop material coming between the teeth and plate, and a rotary shaft affixed to said cutter-bar to turn the same, the improvement which consists in providing the telescoping portions of said hopper and support of thermoplastic material and providing an undulated bead inside the cylindrical portion of said hopper engaging the top of said undulated slotted plate about its peripheral portion to prevent its upward displacement and hold the plate against turning in said hopper, the lower portion of said hopper having substantially vertical slots provided in diametrically opposite sides thereof in which the shaft is rotatably received at opposite ends for bearing support of the shaft and cutter-bar assembly, the cutter-bar being curved diametrically to conform on its one side to the inside curvature of the diametrical portion of the slotted plate and conform on its other side to said shaft to which it is secured, two spacer washers on said shaft abutting opposite ends of said cutter-bar to engage the sides of the cylindrical lower portion of said hopper and maintain the teeth of said cutter-bar in registering relationship to the slots in said undulated plate, said spacer washers serving to limit end-play of said shaft and cutter-bar while the undulated bead locates said slotted plate in a predetermined operative relationship to the shaft and cutter-bar, said slotted plate being held against downward displacement from operative position by said shaft, said slotted plate being in a limited floating relation to said bead and cutter-bar to allow shifting of the interengaging cutter-bar and slotted plate to avoid clashing.

2. The method of permanently assembling together two telescoping body parts of a material chopping device of the character described, the steps comprising forming one body part which is the hopper with a hollow cylindrical discharge end portion of thermoplastic material, forming the other body part which is a support for said hopper with a hollow cylindrical portion of thermoplastic material and adapted for telescoping on the discharge end portion of the hopper, assembling chopping mechanism in the discharge end portion of said hopper through the lower end thereof, thereafter assembling the cylindrical portion of said support in telescoping relation to the discharge end portion of said hopper to retain the chopping mechanism in the latter, and finally rotating at least one of said telescoped parts at high speed relative to the other to develop sufficient heat of friction therebetween to soften the thermoplastic parts sufficiently for fusion, the rotation being then discontinued to permit permanent fusion of the parts together.

3. The method as set forth in claim 2, in which the thermoplastic discharge end portion of the hopper terminates in a flat end face normal to the axis of said discharge end portion, and the hollow cylindrical thermoplastic portion of said support adapted for telescoping on the discharge end portion of the hopper has an annular shoulder provided thereon which by abutment with the flat end of the hopper serves to locate the support in a predetermined endwise relationship to said hopper to maintain predetermined working clearance for the chopping mechanism therein, said annular shoulder in the rotation of at least one of said telescoped parts at high speed relative to the other being also heated to the point of fusion.

4. The method as set forth in claim 2, in which the mechanism includes a drive shaft extending transversely with respect to the discharge end portion of said hopper, said discharge end portion having diametrically opposed slots provided therein opening from the lower end thereof in which said shaft finds bearing support at its opposite ends, the cylindrical portion of said support terminating in a flat end face normal to the axis of said cylindrical portion for locating and bearing abutment with the ends of said shaft for operation of the chopping mechanism with a predetermined operating clearance while permitting the relative rotation between the telescoped parts required for softening the thermoplastic parts sufficiently for fusion.

5. The method as set forth in claim 2, in which the mechanism includes a drive shaft extending transversely with respect to the discharge end portion of said hopper, said discharge end portion having diametrically opposed slots provided therein opening from the lower end thereof in which said shaft finds bearing support at its opposite ends, the cylindrical portion of said support terminating in a flat end face normal to the axis of said cylindrical portion for locating and bearing abutment with the ends of said shaft for operation of the chopping mechanism with a predetermined operating clearance while permitting the relative rotation between the telescoped parts required for softening the thermoplastic parts sufficiently for fusion, the discharge end portion of the hopper terminating in a flat end face normal to the axis of said end portion, and the cylindrical portion of said support having an annular shoulder provided thereon for abutment with said end face on said hopper to locate said telescoped parts in a predetermined endwise relationship to one another and the shaft in a predetermined relationship to the rest of the chopping mechanism while still permitting the relative rotation of the telescoped parts necessary for fusion.

References Cited

UNITED STATES PATENTS

| | | | |
|---|---|---|---|
| 2,933,428 | 4/1960 | Mueller | 156—73 |
| 3,313,331 | 4/1967 | Di Pierro et al. | 146—123 |
| 3,357,468 | 12/1967 | Brinch-Moller | 146—123 |

ANDREW R. JUHASZ, Primary Examiner

Z. R. BILINSKY, Assistant Examiner